Nov. 12, 1957 V. DURBIN 2,813,163
HEAVY DUTY TREADLE
Filed Sept. 30, 1954 3 Sheets-Sheet 1

*INVENTOR.*
VERNON DURBIN
BY *James and Franklin*
ATTORNEYS

Nov. 12, 1957  V. DURBIN  2,813,163
HEAVY DUTY TREADLE
Filed Sept. 30, 1954  3 Sheets-Sheet 2
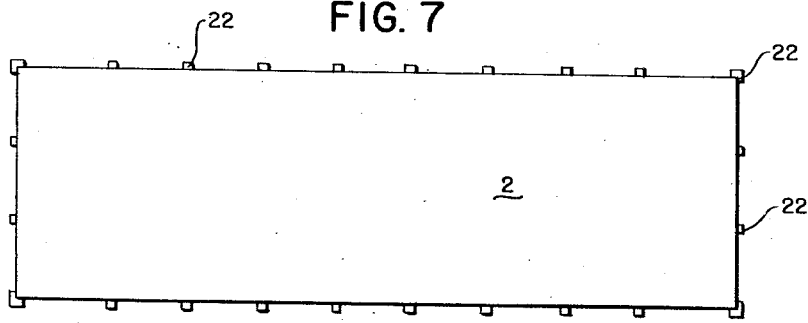
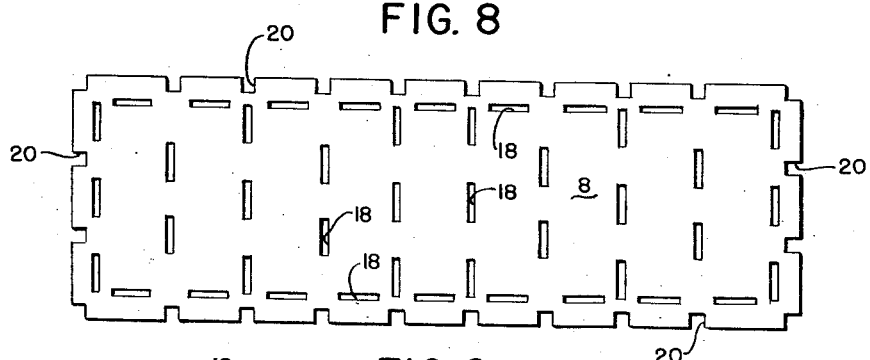
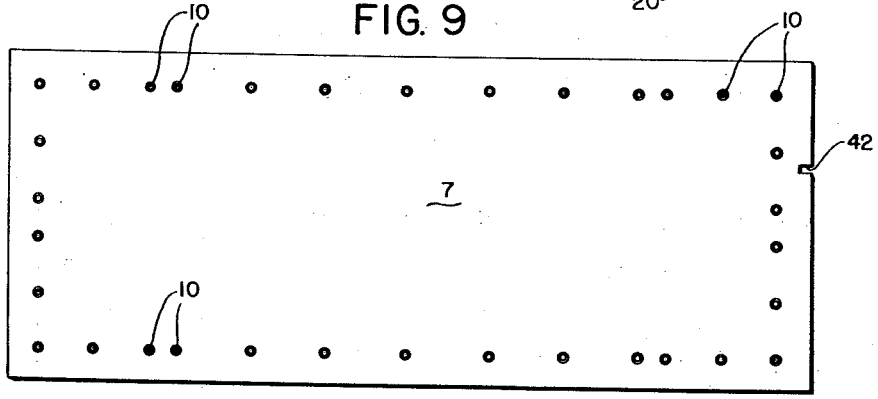
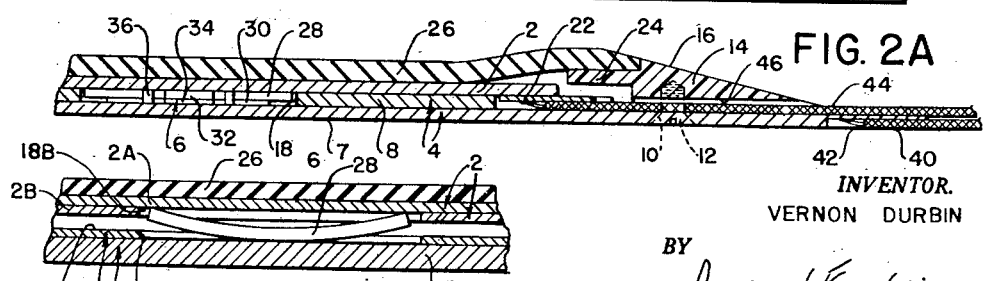
INVENTOR.
VERNON DURBIN
BY
ATTORNEYS Nov. 12, 1957  V. DURBIN  2,813,163
HEAVY DUTY TREADLE
Filed Sept. 30, 1954  3 Sheets-Sheet 3

INVENTOR.
VERNON DURBIN
BY
James and Franklin
ATTORNEYS

United States Patent Office 2,813,163
Patented Nov. 12, 1957

2,813,163

HEAVY DUTY TREADLE

Vernon Durbin, Waban, Mass., assignor to National Pneumatic Co., Inc., Boston, Mass., a corporation of Delaware Application September 30, 1954, Serial No. 459,414

19 Claims. (Cl. 200—86)

The present invention relates to a treadle of the type used, for example, to open and close a control circuit and thus initiate the opening and closing of doors or the like in response to the sensing by the treadle of a weight thereon, and in particular to such a treadle adapted to reliably support very intense concentration of weight at localized areas of its surface.

The use of floor-mounted treadles to control the opening and closing of doors and the like is an extremely old expedient. Conventionally they comprise a pair of conductive elements electrically connected to opposite sides of a control circuit and normally spring urged apart. Whenever a weight is placed on the treadle which is sufficient to compress the springs, the conductive elements are moved into engagement, the control circuit is closed, and the appropriate external operation, such as the opening of the door, is initiated.

Obviously such treadles are effective only if the conductive elements are separated when the required weight is not present on the treadle. While this would appear to be a fairly simple matter, in practice, it has not proved to be so, largely because of the great forces to which the treadles are often subjected, which forces tend toward distortion of the treadle elements. In industrial installations, where heavy duty treadles are required as a matter of course, a truck rolling on small diameter casters and heavy loaded quite often exerts a pressure of two tons or more per square inch on that restricted area of the treadle which it engages, and such pressures if applied at certain points will be sure to cause damage eventually. Even on treadles not likely to be subjected to such great pressures, the problem still exists. The high pressure concentration which results from the engagement of that treadle with the tip of a crutch supporting a crippled man greatly exceeds the pressure which would result if his weight were distributed normally by his feet. Ladies' high heels present a similar problem.

The situation is complicated by the requirement that the treadles in general must be actuable by light weights as well as by exceedingly heavy weights. The weight of an empty hand truck or even of an individual should be sufficient to actuate the treadle even though that treadle must be capable also of being actuated without damage by weights of many tons. It is very difficult to design a treadle which will reliably resist distortion when subjected to heavy weights and high pressure concentrations, and which is sensitive enough to detect light weights.

Another complicating factor is the requirement that while the treadle must have an appreciable surface area it must be capable of actuating the control circuit no matter where on that area pressure may be applied.

The structures of the prior art have attempted to satisfy these various requirements essentially by a process of compromise and by a comparative complexity of structure which adds greatly to the expense of the product. In order to provide for sensitivity of the treadle over its entire surface, a large number of individually electrically contacting areas are provided, but there are still areas where, if pressure is applied, electrical connection is by no means certain. In order to make the treadle sensitive to light weights, comparatively weak springs are employed to separate the elements adapted to electrically engage one another, and in order to permit the treadle to withstand high pressures, more stiffly resilient reinforming elements are provided between or adjacent such elements. As a result the sensitivity of the treadle varies from point to point over its surface, and, moreover, the application of a very high concentration of pressure will, if exerted just next to or partially over and partially to one side of the reinforcing elements, tend to distort the structural elements of the treadle, thus eventually leading to a situation in which electrical connection is made through the treadle even when no weight at all is applied thereto. Obviously this destroys the treadle's usefulness, and it must either be repaired or replaced.

According to the present invention treadle sensitivity is achieved without any sacrifice in uniformity of sensitivity over the entire area of the treadle, and the construction is such as to make it almost impossible to distort the treadle elements, hence making the life of the treadle substantially independent of length or manner of use.

To accomplish these objectives the elements adapted to make electrical connection through the treadle are defined by plates having facing surfaces. These plates are normally urged apart by means of springs, but when pressure is applied to the treadle the plates are moved into engagement. Specifically, they are moved into face to face engagement over all or a substantial proportion of their entire facing surfaces. The springs which normally urge the plates apart are so constructed and mounted as not to interfere with the face to face engagement of the treadle plates. When the treadle is depressed, therefore, the weight of the object depressing it is transmitted to the floor through a solid thickness of material. Hence only a force capable of actually indenting a solid metal sheet can in any way modify the operative structural elements, and even then such modification or distortion would probably not affect the functioning of the device. In addition, because of the face to face contact of the plates, a contact area of appreciable magnitude results, thus ensuring that the control circuit will be closed even though certain portions of the facing surfaces of the treadle plates may be dirty or corroded.

The springs which maintain the plates normally spaced from one another are distributed over the area of the plates. In order that they should not interfere with face to face contact between the plates, they are housed within recesses in the plates, the recesses being sufficiently deep so that when the plates are in face to face contact the depth of the recesses will be no less than the solid height of the compressed spring. Furthermore, in order to ensure that the treadle will be able reliably to support weight with localized very high pressure concentrations over its entire operative surface not excluding the areas where the springs are provided, the recesses within which the springs are received are adapted to have substantially the same depth as the solid height of the springs when compressed, and the springs are adapted to substantially fill those recesses. Hence there is no appreciable discontinuity in the solidity of the depressed treadle. As a consequence, no matter where the localized high concentration of weight may be applied over the upper surface of the treadle, that weight will be resisted by a solid, rigid and unyieldable structure, thus effectively ensuring against distortion.

The mode of operation above described is sufficiently significant insofar as reliability of operation over wide ranges of operating conditions is concerned as to be of commercial significance even if a much more complex structure were involved than has previously been the case. However, the structure involved is, in fact, simpler, less expensive, and much more readily assembled than the presently existing commercial structures the operation of which is essentially inferior to that of the present invention. All of the parts may be formed from sheet or molded material, assembly operations are minimal and require little skill, and the overall structure is exceedingly light considering its ability to withstand tremendous weight concentration without damage.

To the accomplishment of the above, and to such other objects as may hereinafter appear, the present invention relates to a treadle construction as defined in the appended claims, and as described in this specification, taken together with the accompanying drawings, in which:

Fig. 2A is a view similar to Fig. 2 but showing the treadle in the condition which it assumes when a weight is applied thereto;

Fig. 7 is a top plan view of the top plate of the treadle;

Fig. 8 is a top plan view of the intermediate plate of the treadle;

Fig. 9 is a bottom plan view of the bottom plate of the treadle;

Figure 1:
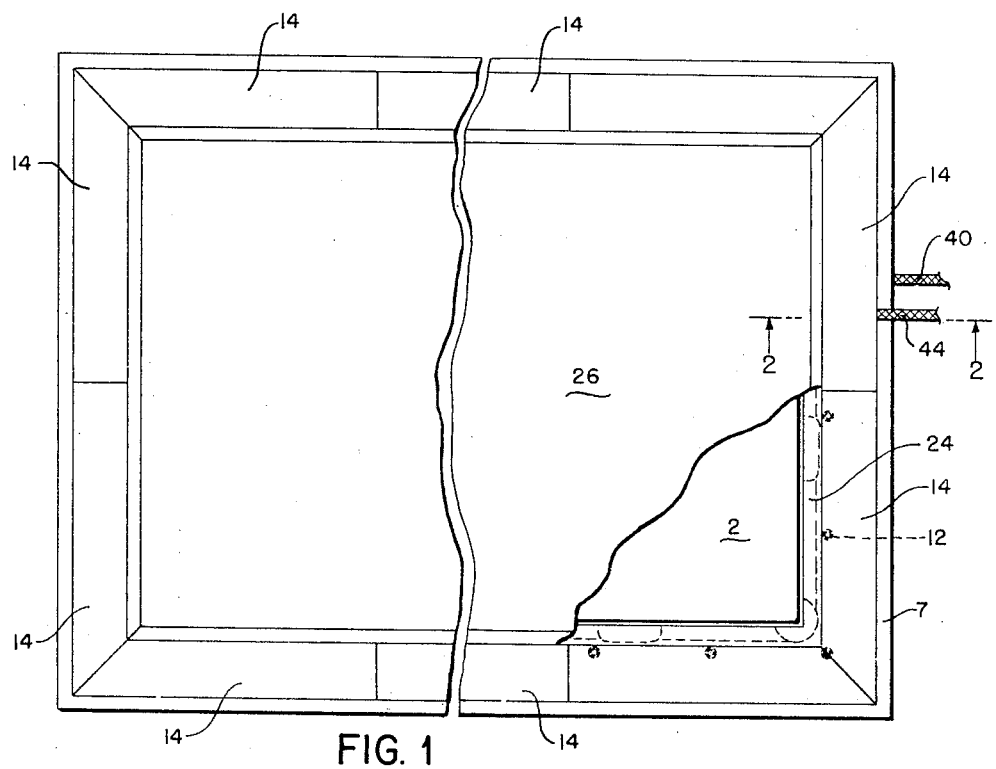
Fig. 1 is a top plan view, partially broken away, of one embodiment of the present invention.
Figure 2:
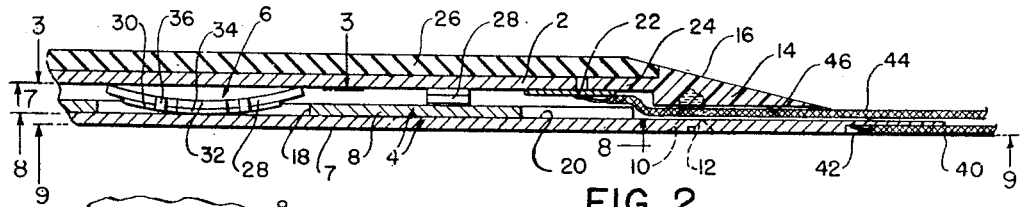
Fig. 2 is a cross sectional view taken along the line 2—2 of Fig. 1, the treadle being shown in the condition which it assumes when no weight is applied thereto.
Figures 3, 4, 6:
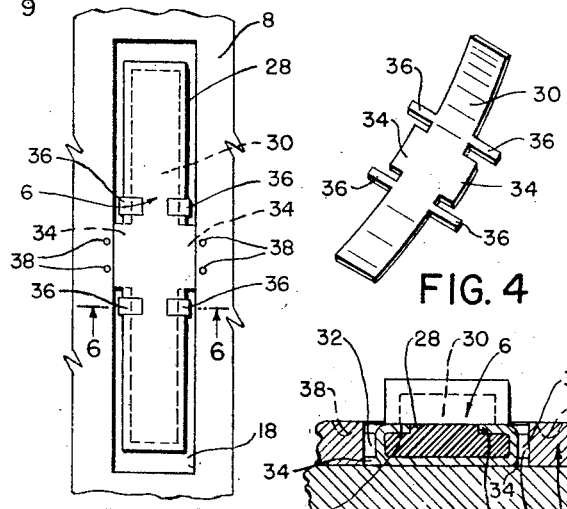
Fig. 3 is a top plan view taken along the line 3—3 of Fig. 2.
Fig. 4 is a perspective view of the metal spring part.
Fig. 6 is a cross sectional view taken along the line 6—6 of Fig. 3.
Figure 5:
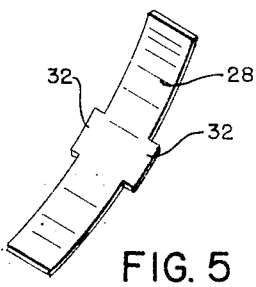
Fig. 5 is a perspective view of the spring part formed of insulating material.
Figure 11:
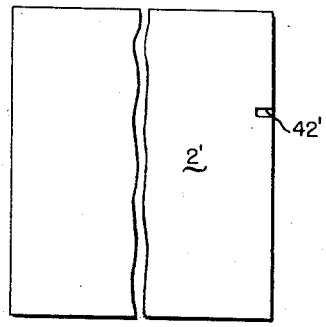
Figure 12:
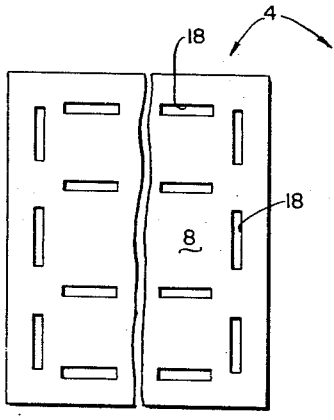
Figure 13:
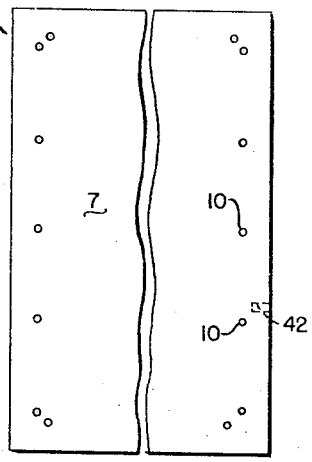
Figure 15:
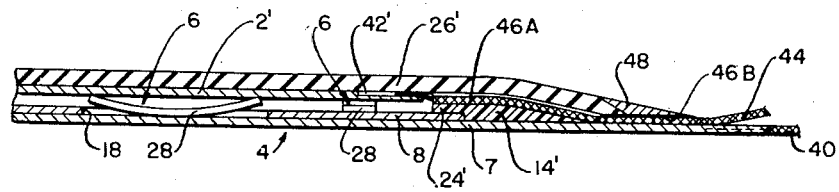
Figures 14, 16:
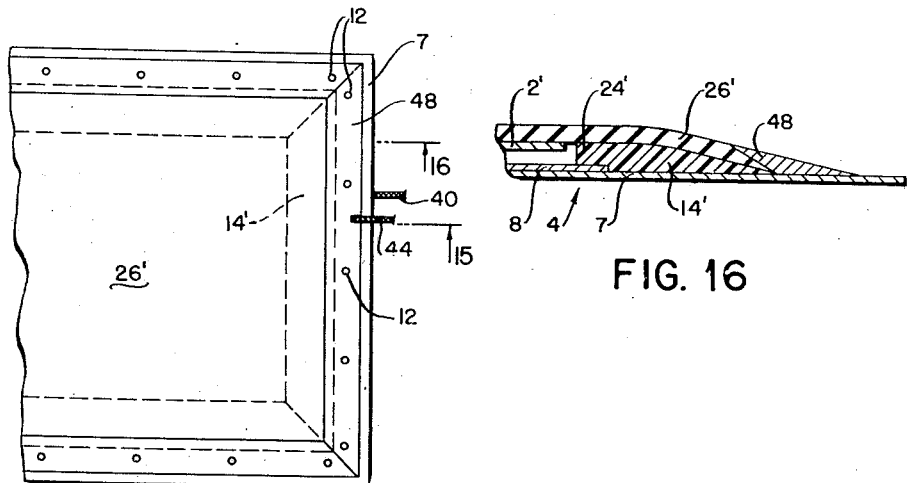

Fig. 10 is a fragmentary cross sectional view similar to Fig. 2 but showing a modified structure; and Figs. 11–16 are views of an alternative embodiment, Figs. 11, 12 and 13 being top plan views respectively of the top, intermediate and bottom plates of the treadle, Fig. 14 being a top plan view of the assembled treadle, and Figs. 15 and 16 being cross sectional views taken respectively along the lines 15—15 and 16—16 of Fig. 14.

The potentially electrically engaging elements of the treadle are defined by a top plate 2 and a bottom plate 4, both conductive, those plates normally being held apart by means of insulating springs 6. The bottom plate 4, which may rest directly on the floor or on the bottom of a recess in the floor, is preferably defined by a base plate 7 and an intermediate plate 8. As may best be seen from Fig. 2 and a comparison of Fig. 9 with Fig. 8, the area of the base plate 7 exceeds that of the intermediate plate 8, and a series of countersunk apertures 10 are provided in that portion of the base plate 7 which extends out beyond the intermediate plate 8, screws 12 being received within the apertures 10, extending up beyond the upper surface of the base plate 7 and being received within insulating molding strips 14 which ring the treadle, securing those molding strips 14 to the base plate 7.

When the treadle is adapted to rest directly on the floor, as in the form here specifically illustrated, the upper surface 16 of the molding strips 14 (see Fig. 2) are beveled so that a truck rolling on the floor can ride up the surface 16 onto the treadle proper. With treadles adapted to be recessed in the floor, the upper surface 16 of the molding strips 14 need not have this incline.

The intermediate plate 8, as well as the base plate 7, may be formed of any suitable conductive material such as aluminum. The intermediate plate 8 is adapted to be centrally secured to the base plate 7 as by spot welding or the like. The plate 8 is provided, over its surface, with a plurality of recesses 18 which, for convenience in manufacture, may pass completely through the plate 8. The edges of the plate 8 may be provided with spaced notches 20, also preferably passing completely therethrough.

The top plate 2 is also formed of a sheet of conductive material such as aluminum, and in the form here disclosed has an area somewhat less than that of the intermediate plate 8. A plurality of tabs 22 extend laterally out therefrom, those tabs preferably being in the form of thin aluminum pieces spot welded or otherwise secured to the undersurface of the plate 2. The tabs 22 are positioned around the periphery of the plate 2 in registration with the notches 20 around the periphery of the intermediate plate 8 and are of a size such as to freely be received within the notches 20, the thickness of the tabs 22, that is to say, the distance which they project beneath the bottom surface of the plate 2, being no greater and preferably less than the depth of the notches 20.

The molding strips 14 have inwardly extending portions 24 which are adapted to overlie the tabs 22 and which extend around the periphery of the treadle outboard of the top plate 2 proper. These portions 24 therefore define downwardly facing ledges against which the tabs 22 engage when the top plate 2 is urged away from the bottom plate 4 by means of the springs 6, thus constituting a positive stop limiting the separation of the top and bottom plates 2 and 4. They also define an upwardly facing ledge on which a flexible protective cover sheet 26 of rubber or the like is adapted to rest, the sheet 26 being held in place by means of adhesive. Moreover, they prevent the top plate 2 from shifting horizontally.

In the form shown in Figs. 2–6, the springs 6 are defined by a bowed leaf 28 of resilient insulating material such as nylon, reinforced by a bowed resilient metallic strip 30 of Phosphor bronze, stainless steel or other comparable material. The central portion of the nylon spring 28 is widened at 32 so as to have a width substantially equal to the width of the recess 18 in which the spring 6 is adapted to be received. The metal spring leaf 30 is shorter than the nylon spring leaf 28, it has a widened central portion 34 of substantially the same width as the central portion 32 of the nylon leaf 28 and adapted to overlie the latter, and it is also provided with arms 36 adapted to be bent around portions of the nylon leaf 28 so as to secure the two leaves 28 and 30 together. Since nylon is a thermoplastic material it is preferred to apply heated pressure to the arms 36 so as to cause them to become embedded in the nylon leaf 28, thus providing for reliable securing action. The overall thickness of the composite spring 6 is substantially equal to the depth of the recess 18 in which it is received, and the length of the nylon leaf 28 when flattened out is only slightly less than the length of the recess 18. The spring 6 is secured in place within the recess 18 by sliding the widened central portions 32, 34 thereof into the center of the slot 18, where they are snugly received, and then reliably retaining them in place by staking the plate 8 at 38 (see Fig. 3).

It will be understood that the specific form which the springs 6 may take, and the particular materials employed, may be varied widely. In place of nylon other insulating materials which also have an appreciable degree of resiliency may be used. Combinations of fibre glass and melamine resin or fibre glass and silicone are particularly advantageous, particularly insofar as resistance to moisture is concerned. "Teflon," a tetrafluoroethylene resin produced by Du Pont, is also quite suitable. The metal spring leaf 30 can be entirely dispensed with in cases where the insulating leaf 38 provides sufficiently reliable restoring force, or, when employed, the metallic leaf 30 may be molded as an insert within the insulating leaf 28 or may be inserted between a pair of insulating leaves 28 to form a "sandwich." All-metal springs 6 could be employed provided that they were appropriately insulated from the plates which they engage.

A wire 40 leading to one side of an appropriate control circuit is electrically connected to the base plate 7, that plate preferably being provided with a groove 42 on the underside thereof within which the wire 40 is adapted to be received and soldered in place. A wire 44 passes through a slot 46 in one of the molding pieces 14 and is soldered to one of the tabs 22 which are secured to the top plate 2.

While in the embodiment above described, the springs 6 are received within recesses 18 formed in the intermediate plate 8 which defines a part of the treadle and bottom plate 4, it will be obvious that some or all of those recesses 18 could be formed in the top plate 2 or, as specifically illustrated in Fig. 10, they could be formed partially in the top plate 2 and partially in the bottom plate 4. In the embodiment shown in Fig. 10 the spring 6 is defined solely by a nylon leaf 28'. The bottom plate 4, as before, is defined by a base plate 7 and an intermediate plate 8, recesses 18a being formed in the intermediate plate 8. However, in the embodiment of Fig. 10, the depth of the recesses 18a is only a fraction of the thickness of the nylon leaf 28. The top plate 2 in Fig. 10 is itself composite, being defined by an upper plate 2a and a lower plate 2b secured together by welding or the like, recesses 18b being formed in the lower plate 2b opposite and in registration with the recesses 18a formed in the intermediate plate 8. The depth of the recess 18b is only a fraction of the thickness of the nylon leaf 28, but the combined depths of the recesses 18a and 18b is substantially equal to the thickness of the nylon leaf 28. The composite nature of the plate within which a recess 18 is formed is not an essential element of the present invention, but is preferred because it is much easier and less expensive to stamp holes completely through one plate and then secure that plate to another than it is to machine a plurality of recesses partway through a plate.

The embodiment illustrated in Figs. 11–16 operates on the same principle as the previously described embodiments but the various parts are held in place in a somewhat different manner. In the embodiment of Figs. 11–16 the molding strips 14' do not extend all the way to the edges of the bottom plate 7. Their inwardwardly extending portions 24' overlie only the intermediate plate 8 and thus retain the intermediate plate 8 in position against the bottom plate 7, thus eliminating the necessity for welding the plates 7 and 8 together. The top plate 2' is free to move vertically within the molding strips 14', its upward movement being limited by its engagement with the flexible protective cover sheet 26', to which it is preferably adhesively secured to within approximately one-half inch from its edge. The edges of the cover sheets 26 extend over and are adhesively secured to the molding strips 14'. Secondary molding strips 48, formed of metal or the like, are mounted on the outwardly projecting portions of the bottom plate 7 by means of the screws 12 which are received within the apertures 10. The strips 48 are so shaped as to overlie the outer edges of the cover sheet 26' and the molding strips 14', thus serving to compress the cover sheet 26' between itself and the molding strip 14' and to hold the molding strip 14', and hence the intermediate plate 8 in position on the bottom plate 7. In order to permit the wire 44 to gain access to the top plate 2', the upper surface of a molding strip 14' is provided with the groove 46a which registers with the groove 46b formed in the lower surface of the molding strip 48. Since the wire 44 will be engaged by the edge of the cover sheet 26', the opening defined by the grooves 46a and 46b will be sealed. Since the edges of the cover sheet 26' are compressed between the molding strips 14' and 48, the entire periphery of the treadle will be sealed. Consequently a substantially water-proof structure is produced. The molding strip 48 serves the further purpose of guiding the rollers of trucks up over the treadle and thus protecting the edges of the cover sheet 26'.

As may best be seen from Fig. 2, when no weight is applied to the treadle the tips of the leaf springs 6 engage the undersurface of the top plate 2 and move it away from the bottom plate 4, thus opening the control circuit. When weight is applied to the top of the treadle at any point along its operative surface, the top plate 2 will be depressed against the action of the springs 6, the tips of those springs moving down until the springs are entirely received within the recesses 18, at which time the plates 2 and 4 will be in face to face contact, that contact, because of the essential rigidity of the plate 2, being effected over an appreciable area. Thus a circuit is completed between the wires 40 and 44, closing the control circuit and performing any desired function, such as the opening of a door. When pressure is released from the upper surface of the treadle, the springs 6 will move the top plate 2 upwardly, separating it from the bottom plate 4, breaking the electrical connection therebetween, and opening the control circuit. During the time that the top plate 2 is moving downwardly or upwardly with respect to the bottom plate 4 the tips of the spring 6 must slide thereover to some degree, but because of the material of which the spring 6 is formed, and particularly when a plastic material such as nylon is employed therefor, no damage will result either to the spring 6 or to the top plate 2.

Because the plates 2 and 4, when engaged, are in face to face contact over a substantial area, and because there is no interruption in that face to face contact, the treadle will then define a solid, although multi-ply, structure of essentially strong materials. Even the recesses 18 are substantially filled by the springs 6, so that those springs rigidly and solidly support those portions of the top plate 2 which overlie the recesses 18. When, as is preferred, the overall thickness of the spring 6 is substantially equal to the depth of the recesses 18, the springs will not in any way interfere with the attainment of face to face contact between the plates 2 and 4. Consequently, no matter even if an extremely high concentration of pressure is applied to a limited area of the upper surface of the treadle, no distortion of the treadle parts will result no matter where on the surface that pressure is localized.

When a truck is rolled onto the treadle, it will usually engage the upper surface of the treadle at a plurality of widely spaced points. Under these circumstances the plate 2 will be moved down into engagement with the plate 4 over substantially its entire area. The concentration of force at the particular points where the casters or wheels of the truck rest on the treadle cannot bend any of the treadle parts but can only, in a very extreme situation, cause cold flow of those parts, and it is very rare that pressures of a magnitude sufficient to cause cold flow are ever encountered. Even if they are encountered, the only effect would be to distort the upper surface of the top plate 2, and even this will not affect the reliability of operation of the treadle. If pressure should be applied to the treadle only near one edge thereof, as if only one side of a truck were rolled onto the treadle, effective electrical contact between the plates 2 and 4 will nevertheless be achieved over a substantial area, the plate 2, because it is not very thick, bending somewhat to permit this. However, since such plates will not bend beyond their elastic limit unless forced to do so, and because nothing in the treadle structure requires a sharp or abrupt bend in the plate 2, no damage will result.

It will be apparent that the treadle structure under discussion utilizes inexpensive components readily fabricatable on a mass production basis to loose tolerances and, except for the molding strips 14, obtainable from sheet material. The parts may very readily be assembled, and the operation of the treadle is both more effective than prior art devices because of increased reliability of electrical contact and more sturdy than prior art devices insofar as resistance to high pressure concentrations at selected points of the upper surfaces of the treadle is concerned.

While but a limited number of embodiments of the present invention have been here disclosed, it will be apparent that many variations may be made in the details thereof without departing from the spirit of the invention as defined in the following claims.

I claim:

1. A treadle comprising a bottom plate and a top plate having substantially parallel planar facing surfaces of appreciable area, each of said facing surfaces including facing conductive areas of appreciable size, at least one of said facing surfaces having a plurality of recesses distributed over its area, and operatively non-conductive springs within said recesses, said springs normally projecting out of said recesses toward and into engagement with the other of said facing surfaces, thereby separating said plates, said springs being compressed to be completely receivable within said recesses when said top plate is forced down toward said bottom plate, the facing conductive areas of said plates abutting, and separate electrical connections to the conductive areas of said two plates respectively.

2. The treadle of claim 1, in which, when said springs are completely received within said recesses, their solid height is substantially equal to the depth of said recesses.

3. The treadle of claim 1, in which said springs comprise bowed leaves having a thickness substantially equal to the depth of the recesses in which they are received.

4. The treadle of claim 3, the central portion of said leaves having a width substantially equal to the width of said recesses and being retained within said recesses and the tips thereof having a smaller width and normally extending out from said recesses toward said other facing surface, the length of said leaves being no greater than the length of said recesses.

5. The treadle of claim 1, in which said springs comprise composite bowed leaves each comprising a strip of resilient insulating material and a strip of metallic resilient material secured thereto, said strips having a combined thickness substantially equal to the depth of the recesses in which they are received.

6. The treadle of claim 5, a central portion of said composite leaves being retained within said recesses and the tips thereof normally extending out from said recesses toward said other facing surface, the length of said leaves being no greater than the length of said recesses.

7. The treadle of claim 5, the central portion of said composite leaves having a width substantially equal to the width of said recesses and being retained within said recesses and the tips thereof normally extending out from said recesses toward said other facing surface, the length of said leaves being no greater than the length of said recesses.

8. A treadle comprising a bottom plate, a top plate positioned thereover and having tabs projecting laterally out therefrom, extending down therefrom by a distance no greater than the thickness of said bottom plate and clearing said bottom plate, ledges fixed with respect to said bottom plate and overlying said tabs so as to define stops limiting the movement of said top plate away from said bottom plate, a plurality of recesses in at least one of said plates distributed over the surface thereof and which face the other of said plates and which extend away from said other plate, and springs in said recesses and normally projecting out therefrom into engagement with said other plate so as to keep said plates separated, said springs yielding to permit said plates to be moved into face to face engagement.

9. The treadle of claim 8, in which said springs, when said plates are in face to face engagement, have a solid height substantially equal to the depth of the recesses in which they are received.

10. The treadle of claim 8, in which said bottom plate comprises a base member and a sheet thereover having apertures therethrough defining said bottom plate recesses, said base member extending out laterally beyond said sheet and said ledges being secured to said laterally extending part of said base member.

11. The treadle of claim 10, in which said springs, when said plates are in face to face engagement, have a solid height substantially equal to the thickness of said sheet.

12. The treadle of claim 8, in which said springs comprise bowed leaves having a thickness substantially equal to the depth of the recesses in which they are received.

13. A treadle comprising a base, a bottom treadle plate resting thereon, said base extending out beyond said bottom plate, said bottom plate having a plurality of recesses in and distributed over the upper surface thereof, a top plate positioned over said bottom plate and having tabs projecting laterally out therefrom, a housing secured to said base outside said top plate and having a projecting ledge beneath which said tabs are received, said ledge-tabs engagement limiting the degree to which said top plate can move away from said bottom plate, said tabs being clear of said bottom plate, and springs in said recesses, normally projecting up therefrom into engagement with said top plate so as to keep said plates separated and yielding to permit said plates to be moved into face to face engagement.

14. A treadle comprising a top plate, a bottom plate positioned thereunder and extending laterally therebeyond, both of said plates being conductive, a cover secured to said bottom plate and extending over said top plate, recesses in at least one of said plates and extending away from the other plate, and operatively non-conductive springs in said recesses and normally projecting out therefrom into engagement with said other plate so as to keep said plates separated, said springs yielding to permit said plates to be moved into face to face engagement, and separate electrical connections to said top and bottom plate respectively.

15. A treadle comprising a base, a bottom treadle plate resting thereon, said base extending out beyond said bottom plate, a housing secured to said base outside said bottom plate and having a projecting ledge beneath which the edge of said bottom plate is received, a top plate positioned over said bottom plate, both of said plates being conductive, a cover secured to said housing and extending over said top plate, recesses in at least one of said plates and extending away from the other plate, and operatively non-conductive springs in said recesses and normally projecting out therefrom into engagement with said other plate so as to keep said plates separated, said springs yielding to permit said plates to be moved into face to face engagement, and separate electrical connections to said top and bottom plate respectively.

16. A treadle comprising a conductive bottom plate the upper surface of which is provided with a plurality of apertures distributed thereover, a conductive top plate positioned over said bottom plate, means operatively connected to said bottom plate and engageable with said top plate to limit movement of said top plate away from said bottom plate, and insulating springs received within said recesses and normally extending up therefrom into engagement with said top plate so as to move said top plate into engagement with said movement limiting means, said top plate being movable downwardly into face to face contact with said bottom plate against the action of said springs, said spring then being fully received within said recess, and electrical connections to said top and bottom plates respectively.

17. The treadle of claim 16, in which, when said plates are in face to face contact, said springs are fully received within said recesses and have a solid height substantially equal to the depth of said recesses.

18. A treadle comprising a conductive bottom plate the upper surface of which is provided with a plurality of apertures distributed thereover, a conductive top plate positioned over said bottom plate, said bottom plate extending out laterally beyond said top plate, a housing secured to said laterally extending part of said bottom plate and having a ledge operatively engaging said top plate so as to limit its movement away from said bottom plate, and insulating springs received within said recesses and normally extending up therefrom into engagement with said top plate so as to move said top plate into engagement with said ledge, said top plate being movable downwardly into face to face contact with said bottom plate against the action of said springs, said springs then being fully received within said recesses, and electrical connections to said top and bottom plates respectively.

19. The treadle of claim 18, in which, when said plates are in face to face contact, said springs are fully received within said recesses and have a solid height substantially equal to the depth of said recesses.

References Cited in the file of this patent

UNITED STATES PATENTS

| | | |
|---|---|---|
| 1,311,214 | Donohue | July 29, 1919 |
| 1,391,591 | Stevens | Sept. 20, 1921 |
| 2,128,058 | Shaw | Aug. 23, 1938 |
| 2,165,227 | Cooper | July 11, 1939 |

FOREIGN PATENTS

| | | |
|---|---|---|
| 406,285 | Great Britain | Feb. 20, 1934 |